May 30, 1961
J. F. STRUEMPH
2,985,973
SELF-CLEANING TIMBER RAKE
Filed Aug. 9, 1957
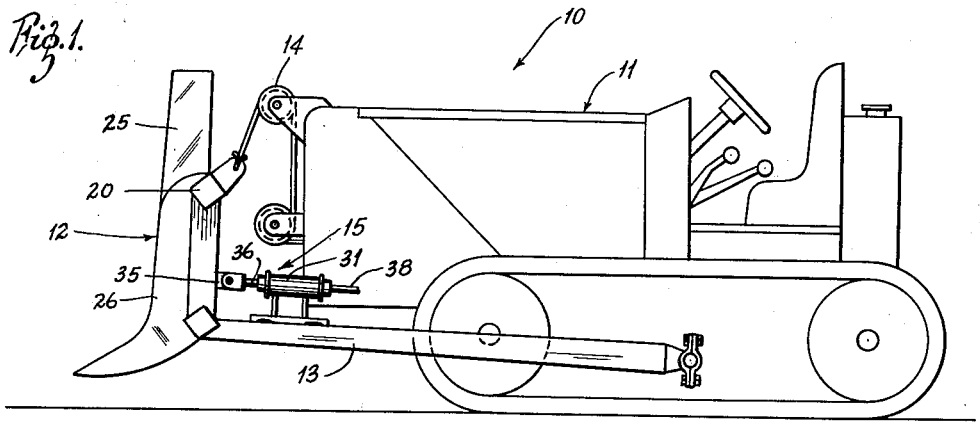
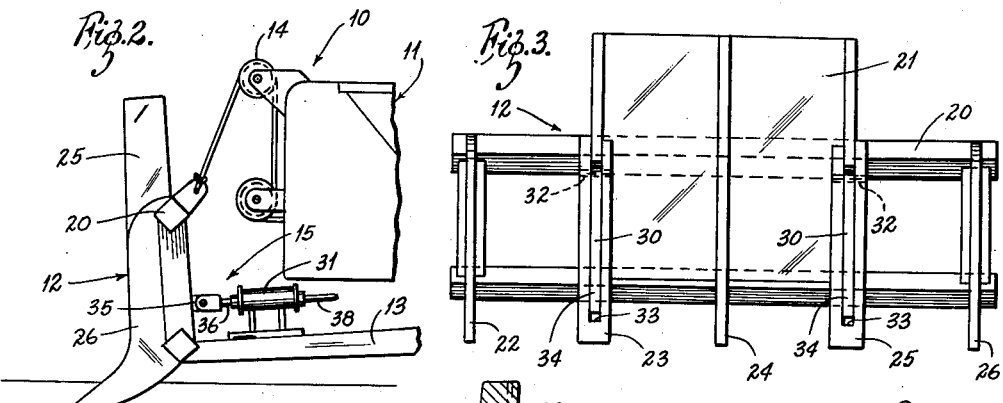
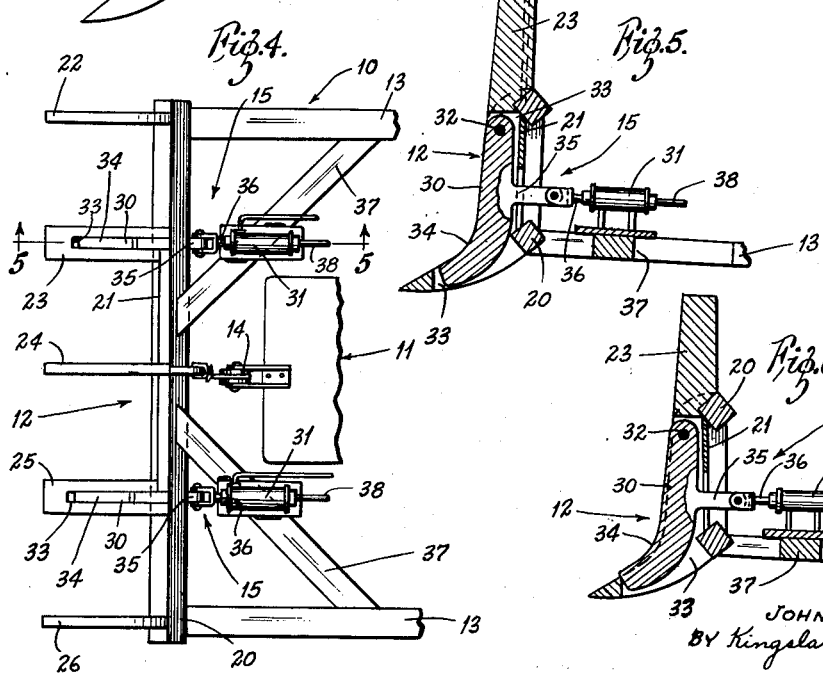
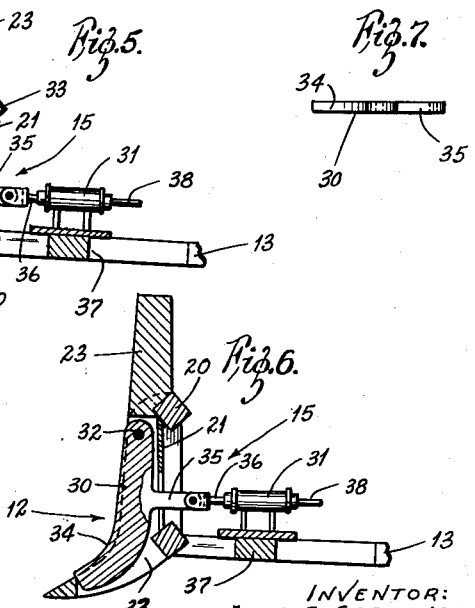
INVENTOR:
JOHN F. STRUEMPH,
BY Kingsland, Rogers & Ezell
ATTORNEYS

United States Patent Office 2,985,973
Patented May 30, 1961

2,985,973

SELF-CLEANING TIMBER RAKE

John F. Struemph, Vienna, Mo.

Filed Aug. 9, 1957, Ser. No. 677,249

4 Claims. (Cl. 37—2)

This invention relates to improvements in timber rakes and land clearing attachments adapted to be used with heavy tractors and in particular is concerned with a mechanism for cleaning and evenly sifting debris from the apparatus.

Timber rakes and other types of land clearing implements have been used with tractors in the past. Such apparatus is used to clear timber or is employed in land clearing operations for a large number of applications. Such apparatus is conventionally shown in my Patents Nos. 2,693,650, issued November 9, 1954, and 2,735,197, issued February 21, 1956. I have found that in the use of such apparatus the prongs which correspond to the tines or teeth of a rake-like element are prone to become clogged with debris. It can readily be understood that in the massive type of clearing of timber or scrub land rocks and dirt and trees and branches constitute a troublesome source and can very easily clog the apparatus. The cleaning of such debris is a time-consuming and difficult task, and can minimize the effectiveness of the land clearing operation.

By means of this invention, there has been provided a timber rake which has self-cleaning teeth which obviates the clogging of the apparatus with debris. In addition, the self-cleaning action not only prevents the clogging of the rake, but aids in laying down a substantially sifted mulch comprised of topsoil, leaves, etc., which is beneficial to the cleared land. Wherever the term "self-cleaning" is employed, it is to be understood that this mulching is also included. The self-cleaning action is accomplished by the means of a relatively moving lifting or cleaning element within the teeth themselves, and which can be operated to extend beyond the contacting surface of the teeth to move any jammed debris. The lifting or cleaning bar can be operated in conjunction with the movement of the timber rake during its operation to effect a continuous shaking action to prevent a clogged condition, or may be employed when it is in a rest position at the will of the operator.

The self-cleaning mechanism has been provided in a relatively simple structure and can be conveniently incorporated into the timber rake attachments. The operation may be effected by relatively unskilled operators and the apparatus is rugged in construction and relatively simple to install and maintain.

It is a primary object of this invention to provide a timber rake or land clearing apparatus with a self-cleaning mechanism for preventing the build-up and/or removing clogged debris and the like from the apparatus.

It is a further object of this invention to provide a timber rake or land clearing apparatus having a self-cleaning mechanism for removing debris comprising a relatively moving, shaking or cleaning bar.

It is still another object of this invention to provide a timber rake having a series of prongs or teeth in which there is a self-cleaning mechanism comprising a relatively movable debris clearing element disposed within the teeth for dislodging debris.

Yet another object of this invention is to provide a timber rake or land clearing apparatus having a self-cleaning mechanism which is rugged in construction and can be simply operated by relatively unskilled operators.

Further objects of this invention will appear in the detailed description which follows and will be further apparent to those skilled in the art.

For the purpose of illustration, there is shown in the accompanying drawings a preferred embodiment of this invention. It is to be understood that these illustrations are for the purpose of example only and that the invention is not limited thereto.

In the drawings:

Figure 1 is a view in side elevation of a timber rake attached to a tractor and provided with the self-cleaning mechanism of this invention;

Figure 2 is a fragmentary view in side elevation of the front portion of the tractor equipped with the timber rake and showing the timber rake in a lowered position in a condition for clearing the ground of small trees, stumps and the like;

Figure 3 is a view in front elevation of the timber rake;

Figure 4 is a top plan view of the timber rake and the forward portion of the tractor;

Figure 5 is a view in section taken on line 5—5 of Figure 4 showing the attachment of the cleaning bar to the timber rake structure;

Figure 6 is a view taken similarly to Figure 5, but showing the cleaning bar in the operated position where it protrudes slightly through the front of the timber rake tooth to accomplish the cleaning action; and Figure 7 is a plan view of the cleaning element.

A tractor equipped with a timber rake provided with the self-cleaning mechanism of this invention is generally indicated by the reference numeral 10 in Figures 1 and 2. As shown in these drawings, a tractor 11 is provided with the timber rake 12 which is secured to the tractor by means of a yoke 13 and an operating pulley 14. The self-cleaning mechanism is generally indicated by the reference numeral 15.

The timber rake is of the same general construction as that shown in my aforementioned patents and is adapted to be lowered to a raking or clearing position by letting out slack in the cable trained over pulley 14. The rake will thus pivot through the action of the yoke 13, and can be lowered or raised with respect to the ground.

As shown in Figures 3 and 4, the timber rake is attached to the front portion of the yoke 13 by means of a frame 20. The frame is provided with a central shield 21 to move the bulk of the cleared debris and to protect the front portion of the tractor. Five teeth or prongs 22 through 26 are positioned laterally with respect to the frame and extend from the top to the bottom of the frame with the exception that the intermediate teeth 23 to 25 extend to the top of the shield. The bottoms of the teeth may be provided with earth digging shoes and the like as is well known in the art.

The self-cleaning mechanism 15 is incorporated into the teeth 23 and 25 viewed in Figure 3. However, it should be understood that, where desired, this can be incorporated into all of the teeth. Essentially, the self-cleaning mechanism for the individual teeth comprises a cleaning bar 30 and an operating cylinder 31.

The cleaning bar 30 is positioned within the interior of the individual teeth in an opening provided therein, as shown in Figure 5. It is pivoted around the pin 32 at the top of such an opening 33, as shown for the tooth 23 in said Figure 5. The sides of the opening provide a guide or bearing surface for the cleaning bar to prevent bending or twisting when it is forced against clogged debris. Additionally, there is provided a housing for the cleaning bars when they are in the retracted position. The outer extremity of the tooth has a curved contacting surface 34 which generally conforms with the configuration of the tooth. A connecting arm 35 extends from the medial portion of the cleaning bar to the rear where it is connected to the cylinder 31 by a connecting rod 36.

The operating cylinder 31 is mounted upon a support 37 connected between the yoke 13 and the frame of the rake. Fluid pressure is supplied to the cylinder through the line 38, and it will be understood that the cylinder can be conventionally operated by controls within the tractor equipment which, per se, form no part of this invention.

Operation

The timber rake is shown in the non-operated position in Figure 1 preparatory to use for clearing the ground. It may be lowered to a ground clearing position as shown in Figure 2 by providing slack in the cable trained over pulley 14 which lowers the rake and the yoke 13 about the pivot point at the rear of the yoke. In the position shown in Figure 2, the rake is ready for the conventional ground clearing operation.

In the use of the rake in the ground clearing position shown in Figure 2, the tractor is moved forwardly to uproot small trees, rocks and other objects which are to be cleared. In this operation, the teeth 22 through 26 root up portions of the ground as in a conventional raking operation. However, due to the extreme force applied to the power of the tractor, there is a high degree of likelihood of jamming of debris including rocks, portions of trees and branches and earth along the leading edge of the teeth of the rake. When such jamming occurs, the rake can be rendered ineffective and cleaning is required. In the prevention of such a condition by the dislodgement of such debris by the cleaning bars 30, the self-cleaning mechanism of this invention finds great advantage.

To clear the teeth of the debris and to prevent such accumulation, the tractor operator causes the operation of the cylinder 31 to expand the connecting rod 36 to the front and pivot the cleaning bars 30 to a forward position in a generally clockwise rotation around the pivot points 32. The degree of movement is shown in Figure 6 and need be only relatively slight. However, it will be well understood that the limit of movement of the cleaning elements can be changed where desired and the operator can cause the further expansion of the connecting rod by the operation of the cylinder to further move the cleaning elements in a clockwise position relative to that shown in Figure 6.

It will also be understood that either or both of the cleaning mechanisms 15 associated with the teeth 23 and 25 may be operated. Thus, a single operation or a simultaneous operation may be brought about where desired. The operation of the cleaning elements when the rake is jammed very effectively shakes and cleans the rake of debris which may be lodged between the teeth. This effectively frees the operator from removing such debris manually by a pick, axe or the like and provides for a much greater efficiency of the tractor, which can accordingly be used a longer period of time for actual clearing operations without the requirement of stoppage for clearing of debris. In addition, the debris comprising earth, leaves, etc., is laid down in fairly even form in the manner of a mulch. This feature minimizes the requirements of later ground levelling or smoothing operations.

Although the particular operation of the self-cleaning mechanism has been shown to be controlled by a hydraulic cylinder, it will be readily understood that other types of mechanical connections can be employed. Such types of connections may be by means of linkages and cams and the like, as will be well understood in the art. However, the use of a cylinder has certain desirable attributes in preventing undue strain on the apparatus since the pressure is built up gradually and buckling of linkages, etc., can be minimized by the use of such hydraulic pressure operation.

Various other changes and modifications may be made in the apparatus of this invention as will be apparent to those skilled in the art. Such changes and modifications are within the scope and teaching of this invention as defined by the claims appended hereto.

What is claimed is:

1. A timber rake for use with tractors, said timber rake comprising a plurality of vertically extending teeth, means for connecting said rake to a tractor, and means for cleaning the rake of debris when the rake is in use, said cleaning means comprising a cleaning element housed within one of said teeth, said cleaning element being movable in a substantially perpendicular direction with respect to a front contacting surface of the tooth with which it is coextensive in a rest position to a forward exposed cleaning position to remove debris, said cleaning element being retractable to within the tooth housing, and guide means defined by side walls of the tooth housing opening within which the cleaning element is received to prevent the twisting and bending of the cleaning element when it is moved to the cleaning position and for receiving the cleaning element within the tooth in the retracted position.

2. A timber rake for use with tractors, said timber rake comprising a plurality of vertically extending teeth, means for connecting said rake to a tractor, and means for cleaning the rake of debris when the rake is in use, said cleaning means comprising a cleaning element housed within one of said teeth, said cleaning element being movable in a substantially perpendicular direction with respect to a front contacting surface of the tooth with which it is coextensive in a rest position to a forward exposed cleaning position to remove clogged debris, said cleaning element being retractable to within the tooth housing, and guide means defined by side walls of the tooth housing opening within which the cleaning element is received to prevent the twisting and bending of the cleaning element when it is moved to the cleaning position and for receiving the cleaning element within the tooth in the retracted position and said cleaning element having a debris contacting surface which conforms to the front surface of the tooth within which it is housed, said contacting surface being generally coextensive with the front surface of the tooth when the cleaning element is in the retracted position.

3. A timber rake for use with tractors, said timber rake comprising a plurality of vertically extending teeth, means for connecting said rake to a tractor, and means for cleaning the rake of debris when the rake is in use, said cleaning means comprising a cleaning element housed within one of said teeth, said cleaning element being movable in a substantially perpendicular direction with respect to a front contacting surface of the tooth with which it is coextensive in a rest position to a forward exposed cleaning position to remove debris, said cleaning element being retractable to within the tooth housing, means for pivotally supporting the cleaning element within the tooth at the upper portion of said tooth, and guide means defined by side walls of the tooth housing opening within which the cleaning element is received to prevent the twisting and bending of the cleaning element when it is moved to the cleaning position and for receiving the cleaning element within the tooth in the retracted position.

4. A timber rake for use with tractors, said timber rake comprising a plurality of vertically extending teeth, means for connecting said rake to a tractor, and means for cleaning the rake of debris when the rake is in use, said cleaning means comprising a cleaning element housed within one of said teeth, said cleaning element being movable in a substantially perpendicular direction with respect to a front contacting surface of the tooth with which it is coextensive in a rest position to a forward exposed cleaning position to remove debris, said cleaning element retractable to within the tooth housing, means for pivotally supporting the cleaning element within the tooth at the upper portion of said tooth, and guide means defined by side walls of the tooth housing opening within which the cleaning element is received to prevent the twisting and bending of the cleaning element when it is moved to the cleaning position and for receiving the cleaning element within the tooth in the retracted position, and hydraulically operated means for effecting the movement of the cleaning element.

References Cited in the file of this patent

UNITED STATES PATENTS

| | | |
|---|---|---|
| 187,741 | Whipple | Feb. 27, 1877 |
| 196,744 | Coreth | Nov. 6, 1877 |
| 284,186 | Conway | Sept. 4, 1883 |
| 412,731 | Dawson | Oct. 15, 1889 |
| 890,074 | Lerch | June 9, 1908 |
| 1,779,285 | Munson | Oct. 21, 1930 |
| 2,674,818 | Carnes | Apr. 13, 1954 |
| 2,735,197 | Struemph | Feb. 21, 1956 |
| 2,737,732 | Billings | Mar. 13, 1956 |

FOREIGN PATENTS

| | | |
|---|---|---|
| 206,382 | Australia | Feb. 18, 1957 |